United States Patent
Savvopoulos (10) Patent No.: US 9,057,612 B1
(45) Date of Patent: Jun. 16, 2015

(54) SYSTEMS AND METHODS FOR UNIFIED DIRECTIONS

(71) Applicant: Google Inc., Mountain View, CA (US)

(72) Inventor: Christos Savvopoulos, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/894,487

(22) Filed: May 15, 2013

(51) Int. Cl.
G01C 21/34 (2006.01)
G01C 21/00 (2006.01)

(52) U.S. Cl.
CPC ...................... G01C 21/00 (2013.01)

(58) Field of Classification Search
USPC .......................................... 701/527
See application file for complete search history.

(56) References Cited

U.S. PATENT DOCUMENTS

| | | | | |
|---|---|---|---|---|
| 6,317,686 | B1 * | 11/2001 | Ran | 701/533 |
| 6,591,263 | B1 * | 7/2003 | Becker et al. | 1/1 |
| 7,080,019 | B1 * | 7/2006 | Hurzeler | 705/6 |
| 7,627,423 | B2 * | 12/2009 | Brooks | 701/433 |
| 8,285,571 | B2 * | 10/2012 | Demirdjian et al. | 705/6 |
| 8,725,612 | B2 * | 5/2014 | Mundinger et al. | 705/35 |
| 2003/0177045 | A1 * | 9/2003 | Fitzgerald et al. | 705/6 |
| 2004/0088107 | A1 * | 5/2004 | Seligmann | 701/204 |
| 2005/0216301 | A1 * | 9/2005 | Brown | 705/1 |
| 2006/0129438 | A1 * | 6/2006 | Robinson | 705/6 |
| 2006/0184314 | A1 * | 8/2006 | Couckuyt et al. | 701/202 |
| 2006/0206258 | A1 * | 9/2006 | Brooks | 701/202 |
| 2008/0125959 | A1 * | 5/2008 | Doherty et al. | 701/200 |
| 2009/0299620 | A1 * | 12/2009 | Shin et al. | 701/200 |
| 2010/0030594 | A1 * | 2/2010 | Swart | 705/6 |
| 2010/0036606 | A1 * | 2/2010 | Jones | 701/202 |
| 2010/0153004 | A1 * | 6/2010 | Natsume | 701/201 |
| 2010/0169131 | A1 * | 7/2010 | Robertson | 705/5 |
| 2010/0228574 | A1 * | 9/2010 | Mundinger et al. | 705/4 |
| 2011/0213787 | A1 * | 9/2011 | Cerny | 707/749 |
| 2011/0302048 | A9 * | 12/2011 | Shuchman et al. | 705/26.5 |
| 2012/0253657 | A1 * | 10/2012 | Francis | 701/410 |
| 2013/0046795 | A1 | 2/2013 | Borgerson et al. | |
| 2013/0117057 | A1 * | 5/2013 | Van Moltke et al. | 705/7.13 |
| 2013/0238241 | A1 * | 9/2013 | Chelotti et al. | 701/533 |
| 2013/0261956 | A1 * | 10/2013 | Marks | 701/425 |
| 2013/0265154 | A1 * | 10/2013 | Tumayan et al. | 340/539.13 |
| 2013/0325315 | A1 * | 12/2013 | Beaurepaire | 701/400 |
| 2014/0278071 | A1 * | 9/2014 | San Filippo et al. | 701/465 |
| 2014/0351037 | A1 * | 11/2014 | Shaam et al. | 705/14.23 |

* cited by examiner

Primary Examiner — Calvin Cheung (74) Attorney, Agent, or Firm — Dority & Manning, P.A.

(57) ABSTRACT

Methods and systems for unified directions are described herein. The method includes receiving a list of one or more routes from an origin to a destination for each of two or more different modes of transportation, each route having an associated duration. The durations of routes from each list that are subsequent to a first route from the respective list are penalized. One or more routes from each list are combined to generate a combined list of routes for each of the two or more different modes of transportation. The combined list of routes is sorted to generate a sorted list of routes based, at least in part, on the durations and penalized durations of the routes.

18 Claims, 5 Drawing Sheets

SYSTEMS AND METHODS FOR UNIFIED DIRECTIONS

FIELD

The present disclosure relates to systems and methods for unified directions.

BACKGROUND

Directions can be described as a sequence of maneuvers to follow a route from an origin to a destination, possibly with the inclusion of additional information such as road names, distances, times, or landmarks. Systems for providing directions can employ algorithms for calculating the sequence of maneuvers according to one or more different modes of transportation such as driving, walking, bicycling, transit (such as train, bus, subway), flight, and the like. In addition, directions can be accompanied by a map with the route depicted on the map.

While certain systems allow a user to select from different modes of transportation when requesting a route, such systems are not capable of displaying directions for the different modes of transportation in a unified manner.

SUMMARY

Aspects and advantages of the invention will be set forth in part in the following description, or may be obvious from the description, or may be learned through practice of the invention.

One exemplary implementation of the present disclosure is directed to a method for generating unified directions. The method is executed by a computer system and includes receiving a list of one or more routes from an origin to a destination for each of two or more different modes of transportation, each route having an associated duration. The durations of routes from each list that are subsequent to a first route from the respective list are penalized. One or more routes from each list are combined to generate a combined list of routes for each of the two or more different modes of transportation. The combined list of routes is sorted to generate a sorted list of routes based, at least in part, on the durations and penalized durations of the routes.

Other exemplary implementations of the present disclosure are directed to systems, apparatus, computer-readable mediums, devices, and user interfaces for summarizing routes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure generally relates to systems and methods for unified directions for different modes of travel, such as by automobile, mass transit (including bus, train, subway, or the like), airplane, pedestrian, bicycle, or other modes of travel. Two or more different modes of travel can be presented simultaneously so that a user can compare routes pertaining to each mode of travel to make a determination as to which mode of travel is suitable.

In certain aspects of the present disclosure, a list of one or more routes is received for each mode of travel. Each list can be generated using known methods for generating directions/routes for such mode of travel. Routes subsequent to a first route of each list can be penalized so as to increase the chances that when the different lists are combined and sorted, different modes of travel are present in the results.

For instance, in certain aspects of the present disclosure, routes can each have an associated duration. A penalty can be applied to the duration of the routes so that routes for each different mode of travel can be combined and sorted based on duration. However, it should be understood that routes can be sorted based on other information as well. In certain embodiments of the present disclosure, the routes can be sorted to preserve an order of a list as originally received. In this manner, prior decisions as to route order for a particular mode of travel can be preserved while still integrating certain results from such mode of travel into a list of routes that includes multiple modes of travel.

Figure 1:
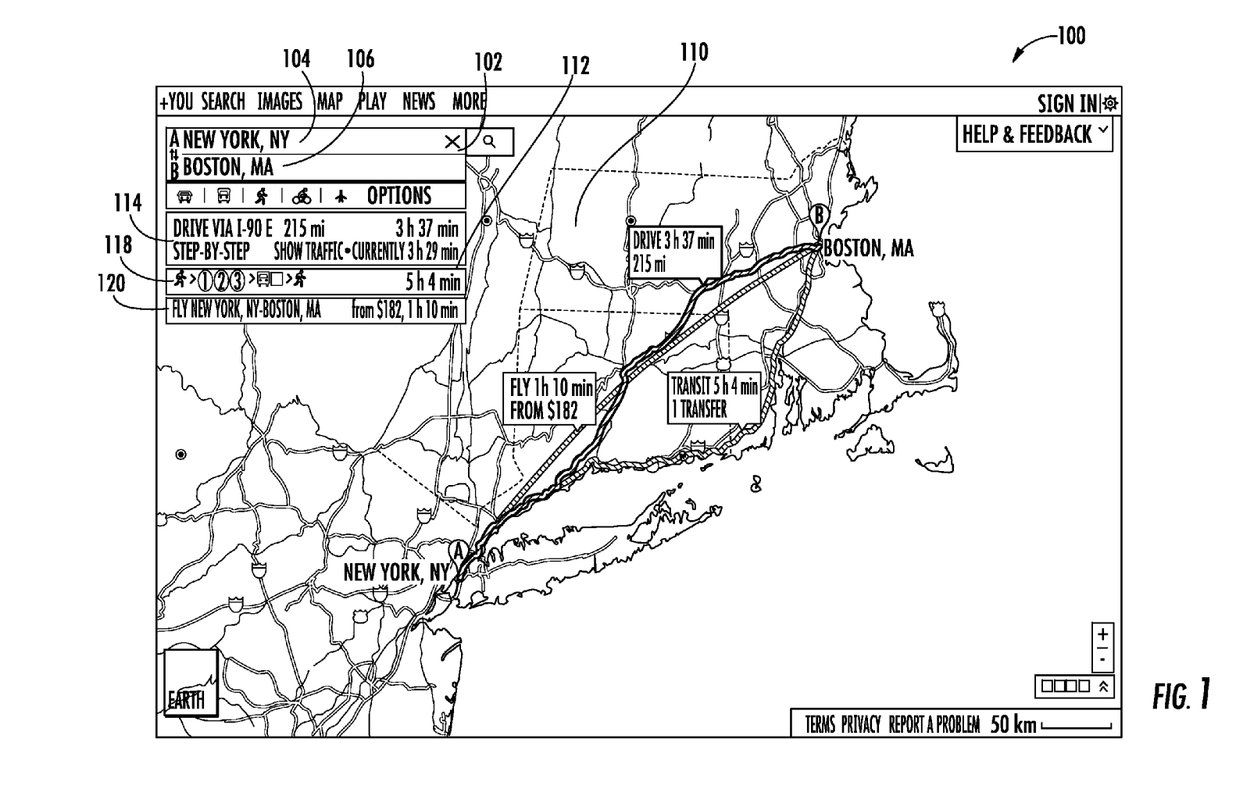
FIGS. 1-3 depict a user interface according to an exemplary embodiment of the present disclosure.
Figure 2:
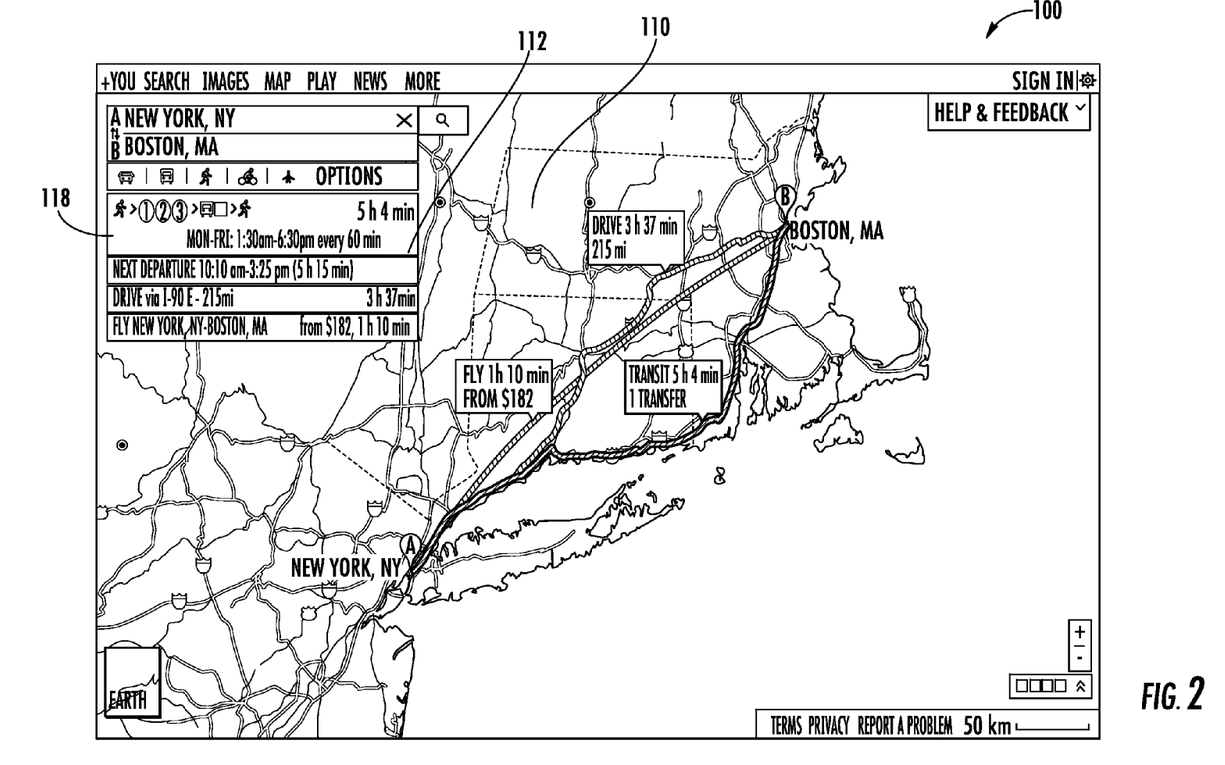
Figure 3:
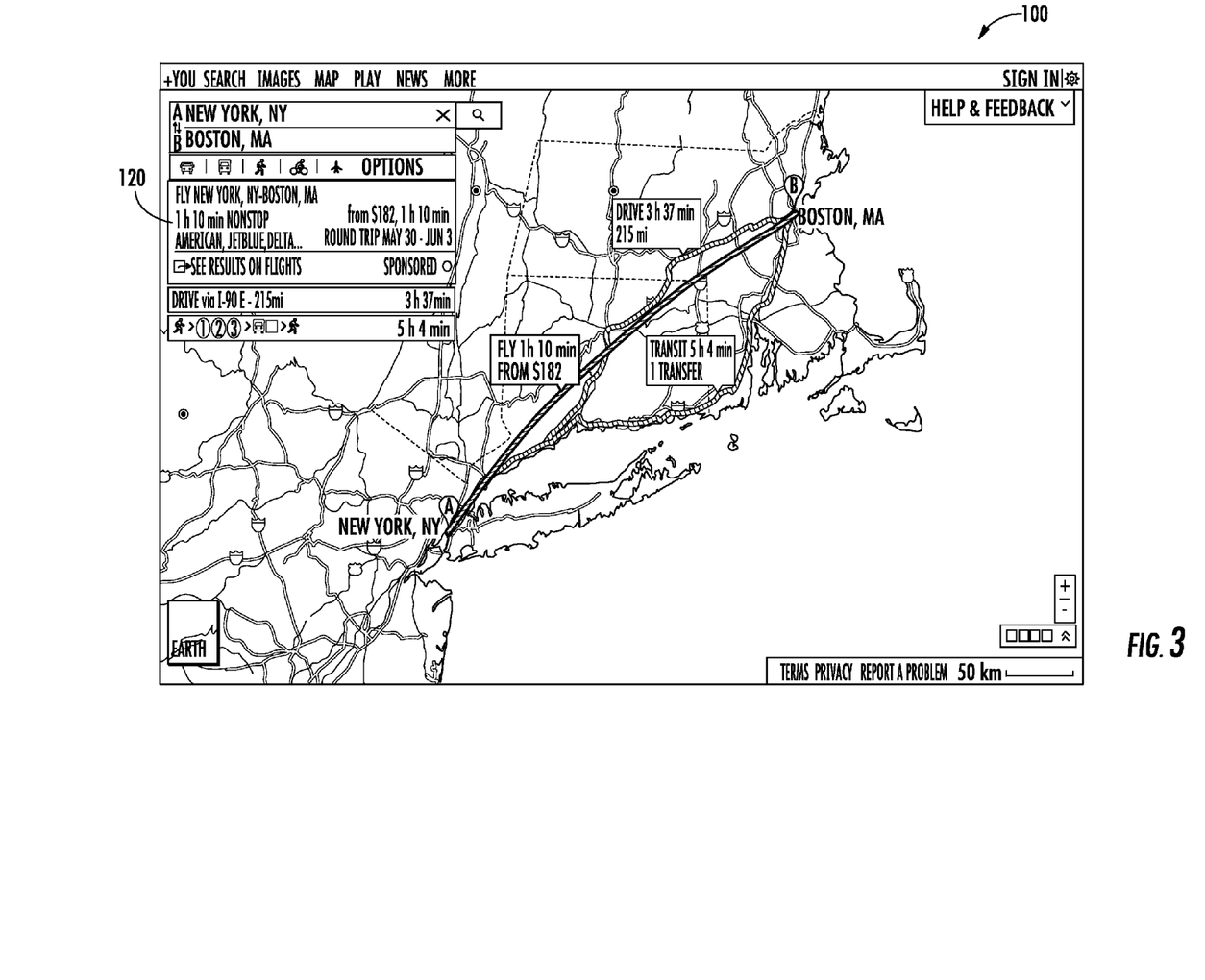

Referring to FIGS. 1-3, an exemplary user interface in accordance with the present disclosure is illustrated. FIG. 1 illustrates an interface 100 that displays travel direction data entry section 102 and map section 110. As shown, a user has entered New York, N.Y. in origin field 104 and Boston, Mass. in destination field 106.

In accordance with the present disclosure, routing for different modes of travel can be simultaneously presented to a user. Unified directions are determined and displayed through interface 100 in travel directions section 112. The unified directions include routing for driving 114, transit 118, and flight 120. However, it should be understood that any number of different modes of transportation can be displayed in accordance with the present disclosure. In addition, although three results are illustrated in travel directions section 112 (one for each mode of travel), any suitable number of results can be presented in accordance with the present disclosure.

In the illustrated embodiment, routing is presented as a summarized description of routing maneuvers with an associated duration. As used herein, routing can refer to a complete set of maneuvers from an origin to a destination, or some subset thereof. In addition, routing results can include other associated information, including mileage, duration, traffic information, transit information, carrier information, price, or combinations thereof. Some or all of such associated information can be provided with routing results as part of the unified direction information. Such associated information can also be available when a user expands one or more routing results to display such information. In addition, links can be provided where such information or still additional information related to the routing results of the unified direction information can be provided. Importantly, the unified directions of the present disclosure allow a user to quickly ascertain information about different modes of transportation. In this manner, a user is better able to determine which route to undertake.

Map section 110 can depict routes associated with the different modes of transportation. Certain routes, such as one or more routes having the shortest duration(s), can be more prominently featured in map section 110 and travel directions section 112. As an example, driving route 114 is more prominently displayed in larger and darker font as compared with transit route 118 and flight route 120 since driving route 114 is the first route presented in the list of possible routes of travel directions section 112. The depicted route for driving route 114 in map section 110 is also darker and more prominent than other depicted routes.

Referring to FIG. 2, regardless of the order in which the results are initially presented, a user can select a different mode of travel for which more information can be presented. When selected, transit route 118 is moved to the first route in the list and is displayed prominently while driving route 114 replaces transit route 118 as the second route in the list. Transit route can also be more prominently displayed in map section 110 when selected. Turning to FIG. 3, flight route 120 is selected and replaces driving route 114, which moves to the second route in the list while transit route 118 replaces flight route 120 as the third route in the list. In certain implementations, a selected route can remain in the listed order when selected. In addition, a single mode of transportation (that is part of the list and/or that is not included in the list) can be selected by a user so that results exclusive to such mode of transportation are presented.

As illustrated, travel directions section 112 depicts three different modes of transportation to a user. A user can consider the presented modes of transportation to determine a mode that is appropriate.

Figure 4:
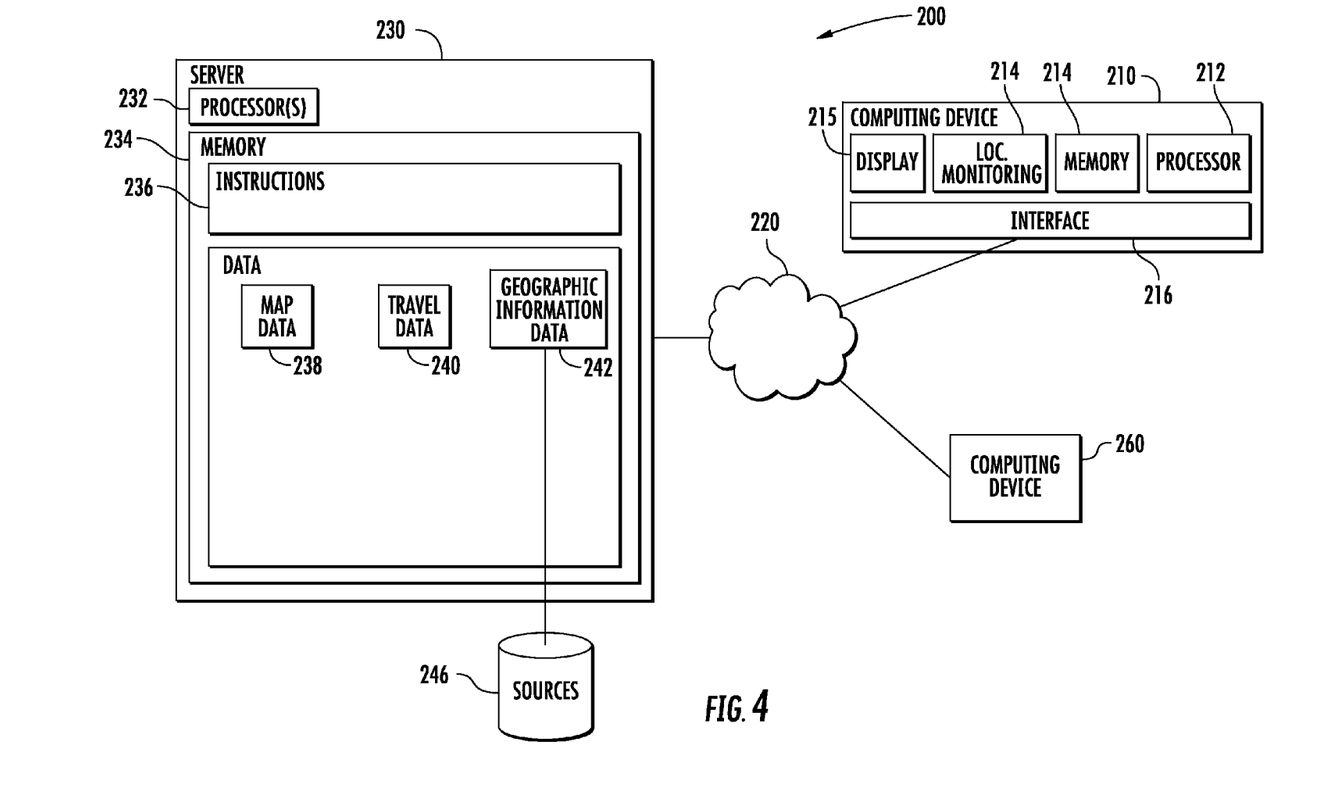
FIG. 4 depicts a block diagram of an exemplary system for unified directions according to an exemplary embodiment of the present disclosure.

FIG. 4 illustrates an exemplary system 200 for generating unified directions according to an exemplary embodiment of the present disclosure. As illustrated, system 200 includes a computing device 210 for providing unified direction information to a user. The computing device 210 device can take any appropriate form, such as a personal computer, smartphone, desktop, laptop, PDA, tablet, or other computing device. The computing device 210 includes appropriate input and output devices, such as a display screen, touch screen, touch pad, data entry keys, speakers, and/or a microphone suitable for voice recognition. A user can request travel directions by inputting origin and destination information into computing device 210. The computing device 210 can then receive unified direction information based on the origin and destination information and provide the information to the user through any suitable output device, such as a display screen 215. In certain aspects of the present disclosure, the computing device 210 can independently calculate the unified direction information based on the origin and destination information and provide such information to the user.

The computing device 210 includes a processor(s) 212 and a memory 214. The processor(s) 212 can be any known processing device. Memory 214 can include any suitable computer-readable medium or media, including, but not limited to, RAM, ROM, hard drives, flash drives, or other memory devices. Memory 214 stores information accessible by processor(s) 212, including instructions that can be executed by processor(s) 212. The instructions can be any set of instructions that when executed by the processor(s) 212, cause the processor(s) 212 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 214 can also include data that may be retrieved, manipulated, or stored by processor(s) 214. For instance, after receiving user consent, memory 214 can store information associated with the user of the computing device, such as geographic information associated with the user. As will be discussed in further detail below, such information can be used in the generating unified directions for a specific individual.

The computing device 210 can include a network interface 216 for accessing information over a network 220. The network 220 can include a combination of networks, such as cellular network, Wi-Fi network, LAN, WAN, the Internet, and/or other suitable network and can include any number of wired or wireless communication links. For instance, computing device 210 could communicate through a cellular network using a WAP standard or other appropriate communication protocol. The cellular network could in turn communicate with the Internet, either directly or through another network.

Computing device 210 can also have a location monitoring component 218 for generating location information for the computing device 210. For instance, the computing device 210 can include a GPS module or can include a component for determining the position of the computing device 210 based on signals received from one or more cell phone towers. The computing device 210 can communicate location information over network 220 or utilize such information independently for use in providing routing information to the user.

In situations in which the systems and method discussed herein collect information about users, such as position data, user preferences, or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in or more ways before it is stored or used, so that personally identifiable information is removed.

Computing device 210 can communicate with one or more other computing devices 230 over network 220. Computing device 230 can be a server, such as a web server, that provides information to a plurality of client computing devices, such as computing devices 210 and 260 over network 220. Computing device 230 receives requests from computing device 210 and locates information to return to computing devices 210 responsive to the request. The computing device 230 can take any applicable form, and can, for instance, include a system that provides search services, such as the services provided by Google Inc. However, in certain aspects of the present disclosure, computing device 210 can also compute unified direction information independently from computing device 230.

Similar to computing device 210, computing device 230 includes a processor(s) 232 and a memory 234. Memory 234 can include instructions 236 for receiving routing request information from a client device and for generating routes for presentation to the client device based on the routing request information. Memory 234 can also include or be in communication with various databases containing information for presentation to a user and for generating route information. For instance, memory 234 can include one or more instances of a map database 238, travel parameter database 240, and a geographic information database 242. As will be discussed below, processor(s) 232 can be configured to execute instructions stored in memory 234 to provide unified direction information to a user based at least in part on information stored in map database 238, travel parameter database 240, and/or geographic information database 242. In certain aspects of the present disclosure, memory 214 of computing device 210 can also be associated with one or more of the above described databases independent of computing device 230.

Map database 238 stores map-related information, at least a portion of which can be transmitted to or present in a client device, such as computing device 210. For instance, map database 238 can store map tiles, where each tile is an image of a particular geographic area. Depending on the resolution (e.g. whether the map is zoomed in or out), a single tile may cover an entire state in relatively little detail or just a few streets in high detail.

The map database 238 can also include points of interest. A point of interest can be any item that is interesting to one or more users and that is associated with a geographical location. For instance, a point of interest can include a landmark, stadium, or building. A point of interest can be added to the map database 238 by professional map providers, individual users, or other entities.

The map database 238 can also store street information, transit information, airport information, walking path or bicycling path information, or the like. In addition to street images in the tiles, the street information can include the location of a street relative to a geographic area or other streets. For instance, map database 238 can store information indicating whether a traveler can access one street directly from another street. Street information can further include street names where available, and potentially other information, such as distance between intersections and speed limits. Transit information can include locations of transit lines, stations, or the like. All or some of the foregoing can be used by processor(s) 232 and/or processor(s) 212 to compute a route between an origin and destination.

The travel parameter database 240 stores various travel parameters that can be used in the determination of a route from one location to another. For instance, travel parameter database 240 can include information associated with estimated trip time while traversing a particular street or path between locations. Travel parameter database 240 can include information associated with average speed over a particular street or traversable path. Travel parameter database 240 can further include traffic information that can be used in the computation of a route. For instance, travel parameter database 240 can include real-time traffic conditions obtained from, for instance, a traffic service. The travel parameter database 240 can include information obtained from public agencies, roadway monitors, traffic cameras, and the like. The information can include real-time information concerning the speed of traffic flow at particular points in a transportation system. In accordance with the present disclosure, one or more different travel parameter databases can be accessed to generate a list of routes for different modes of transportation. For instance, a first travel parameter database can be accessed to receive a list of routes for driving directions. Another database can be accessed to receive a list of routes for transit. directions. Still another database can be accessed to receive a list of routes for flight routes. And yet another database can be accessed to receive a list of routes for walking and/or bicycling directions.

Geographic information database 242 can include information optionally provided with prior consent by a particular user of the unified direction system 200. For instance, a user of computing device 110 can indicate that the user wishes to share information with computing device 130, such as home address information, work address information, historical routes taken by the user, a location for which a user has previously indicated familiarity, or other information. The geographic information database can mine such information from a variety of sources 246 such as web browsing history, search history, maps history, address books, social networks, blog archives, e-mail archives, calendar entries or the like. Other information, such as credit card transaction information, can be utilized as well. Again, no such information or data is collected or used until the user has been provided meaningful notice of what information is to be collected and how the information is used.

Within one or more computing devices 230, processor(s) 232 can compute a list of routes for different modes of transportation in response to requests from a user device, such as computing device 210. Alternatively, computing device 210 can compute routes for different modes of transportation independently of computing device 230.

Once a list of routes have been determined, computing device 130 can provide such route information to computing device 110 over network, in embodiments where computing device 130 calculates such routes. The route information can be provided to computing device 110 in any suitable format. For mobile devices, the information can be transmitted as an HTML document or other fully-formatted document that will not require significant processing by the mobile device. The information can include HTML code, XML messages, WAP code, Java applets, xhtml, plain text, voiceXML, VoxML, VXML, or other suitable format, that causes the device to display the suggested route information.

The route information can include information in addition to maps with routes rendered on them or the maneuvers associated with the summarized route. For instance, locations on the map could be provided with hyper-linked icons whose selection will cause information to be broadcast to the user. Other information could include annotations associated with points of interest along the travel route. The annotations displayed to the user could be selected based on personal preferences optionally shared by the user with the system.

Figure 5:
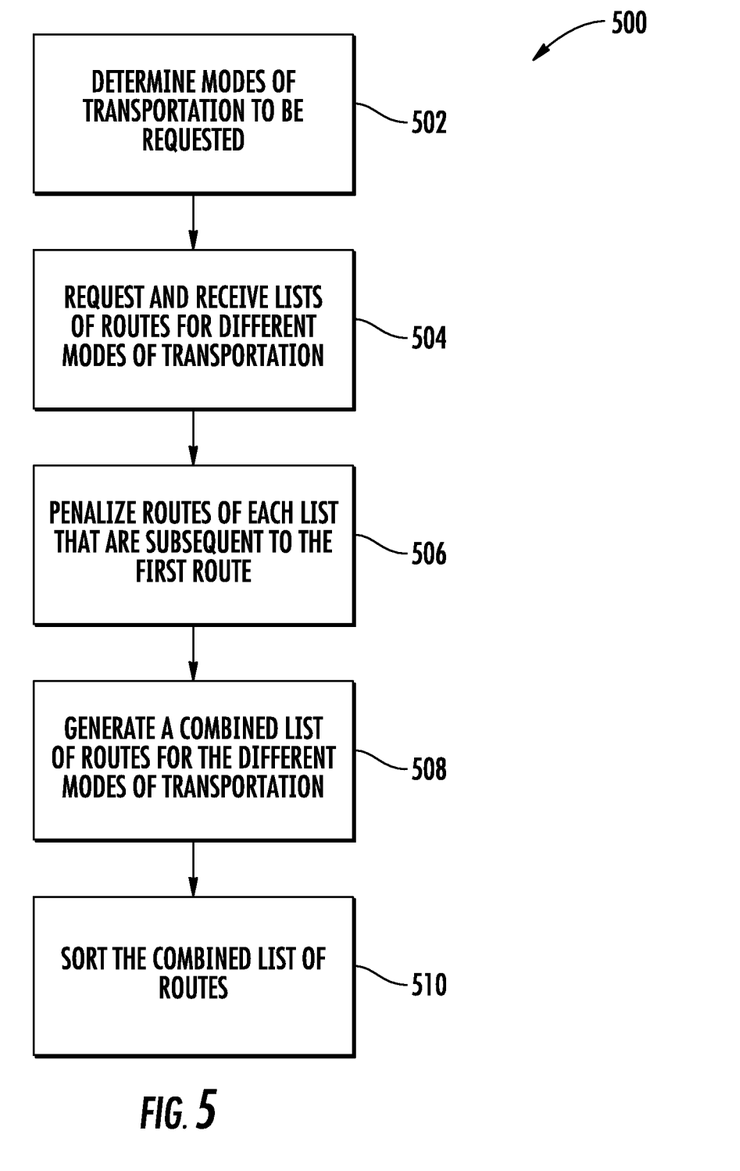
FIG. 5 depicts a flow diagram of an exemplary method according to an exemplary embodiment of the present disclosure.

FIG. 5 is an exemplary flow diagram of a method (500) for generating unified directions. The method shown in FIG. 5 will be discussed with reference to the system 200 illustrated in FIG. 4. However, those of ordinary skill in the art, using the disclosures provided herein, will appreciate the methods discussed herein can be executed by any computing device or combination of computing devices.

Optionally, the method can include evaluating the distance between a user provided origin and destination to determine appropriate modes of transportation to be requested (502). The origin information can be manually entered by a user on computing device 210 or can be based on a user's current location determined by, for instance, the location monitoring component 218. The destination information can be manually entered by the user or can be automatically retrieved based on the information associated with the user, such as the user's calendar information. For instance, the destination information can be based on an intended location for a meeting scheduled in a user's calendar. If the distance between the origin and destination is not large, such as less than 1 km, or less than 0.5 km, or even less, or any other suitable distance, certain transportation modes may not be requested. For instance, flight routes and perhaps even driving routes may not be requested for such short distances. Alternatively, if the distance is greater than 10 km, or 20 km, or even greater, or any other suitable distance, certain transportation modes may not be requested. For example, walking directions may not be appropriate for longer distances.

Additionally, the method at (502) can evaluate the origin, destination, or and/or one more regions therebetween to determine which modes of transportation should be requested. For example, transit coverage in the areas of one or more of the origin, destination, or and one more regions can be evaluated to determine if suitable transit options are available for transit routes to be requested and presented. Similarly, walking or bicycle trail coverage can be evaluated to determine walking or bicycle routes should be requested.

Referring back to FIG. 5, lists of one or more routes from an origin to a destination for different modes of transportation are requested and received at (504). Each route includes a sequence of maneuvers to follow the route from the origin to the destination and each route can have an associated duration. The lists and routes can be generated by using information from one or more map databases 238 and travel parameter databases 240 and the system of the present disclosure can calculate the sequence of maneuvers according to conventional criteria such as fastest route, shortest route, avoidance of roads, and the like, as would be understood by one of ordinary skill in the art. As discussed herein, the list of routes can be requested from one or more different systems that are configured to generate routes for one or more particular modes of transportation. As an example, a flight search database can be queried for flight routes while a driving direction database can be queried for driving routes.

The list of routes can be in a particular order as determined by the system from which the list of routes is received. Such order can be preserved when the list is received by the presently described method.

At (506) the routes of each list that are subsequent to a first route of the respective list are penalized. In this regard, the durations of such routes can be penalized. However, any suitable criteria can be penalized in accordance with the present disclosure. The penalty can be based on any suitable method, such as a standard penalty of 10%, 20%, 30% or the like against every route subsequent to a first route. Alternatively, or in addition to such penalty, in some aspects of the present disclosure, certain modes of transportation can be penalized more than other modes of transportation. For instance, driving routes can be penalized more than other routes. Referring again to FIGS. 1-3, the flight route 120 is illustrated last in the provided results, despite the fact that the duration of the flight route 120 is shorter than that of driving route 116 and transit route 118. This can be attributed to the fact that the flight route 120 is penalized in a manner such that when combined with routes of other modes of transportation (as described at (508)), the flight route is considered least favorable. However, in certain embodiments of the present disclosure, the flight route 120 could be considered most favorable based on its duration when compared to that of driving route 116 and transit route 118.

The penalties can also be increasingly applied against the routes of a list. For example, the second route in a list could be penalized less severely than the third route in a list for a given mode of transportation.

At (508), one or more routes from each list are combined to generate a combined list of routes for the different modes of transportation. At (510), the combined list of routes is sorted. In this regard, the combined list of routes can be sorted based on any suitable criteria. For example, the combined list of routes can be sorted based, at least in part, on the durations and penalized durations of the routes. As the first route of each list for each mode of transportation is not penalized, the penalty against the remaining routes in such list can assist to better diversify the combined list of routes with routes from different modes of transportation.

In certain aspects of the present disclosure, the results can be sorted based on the received order of the routes of each list. In this manner, the order can be preserved such that the first route of each list remains prior to subsequent routes of the list, even if criteria such as duration favors a subsequent route.

As an example, a list of routes for driving routes may be received indicating a first route having a duration of 1:00 hour and a second route having a duration of 45 minutes. Despite having a longer duration, the system may list the first route before the second route for any number of reasons, including but not limited to traffic information, user familiarity, perceived safety of the route, lack of tolls, or any other suitable reason. Assuming all subsequent routes are penalized by 10% of duration, the second route as penalized still has a duration of 49.5 minutes, making it shorter than the first route in duration. When the list of routes is combined with other lists of routes and sorted by duration and penalized duration, the second route would be listed prior to the first route. However, the system can also sort based on the received order of the routes of each list, and maintain the first position of the first route, thereby preserving the decision of the system that generated and provided the list of driving routes.

One or more results from the sorted list of routes can be presented to a user. For instance, the top three routes can be presented to a user. Alternatively, the top five routes in the sorted list can be presented to a user. However, it should be understood that any suitable number of routes of the sorted list can be presented to a user.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for generating unified directions, the computer-implemented method comprising:
   receiving, by one or more computing devices, a list of one or more routes from an origin to a destination for each of two or more different modes of transportation, each route having an associated duration;

penalizing, by the one or more computing devices, the durations of routes from each list that are subsequent to a first route from the respective list,
wherein penalizing the durations of the routes comprises increasing the durations of the routes,
wherein the durations of the routes of each list that are subsequent to a first route of the respective list are penalized by at least 10%;
combining, by the one or more computing devices, one or more routes from each list to generate a combined list of routes for each of the two or more different modes of transportation; and
sorting, by the one or more computing devices, the combined list of routes to generate a sorted list of routes based, at least in part, on the durations and penalized durations of routes.

2. The computer-implemented method of claim 1, further comprising calculating, by the one or more computing devices, a distance between the origin and destination to determine the two or more modes of transportation for which the lists of routes are received.

3. The computer-implemented method of claim 2, wherein based on the calculated distance, walking and biking are the modes of transportation for which routes are received.

4. The computer-implemented method of claim 2, wherein based on the calculated distance, driving and flying are the modes of transportation for which routes are received.

5. The computer-implemented method of claim 1, further comprising sorting, by the one or more computing devices, the combined list of routes based on a received order of the one or more routes of each list, wherein the received order is preserved such that the first rout of each list remains prior to the subsequent routes of such list in the sorted list of routes.

6. The computer-implemented method of claim 1, further comprising evaluating, by the one or more computing devices, one or more of the origin, the destination, and a region therebetween to determine the two or more modes of transportation for which the lists of routes are received.

7. The computer-implemented method of claim 6, wherein evaluating comprises determining transit coverage.

8. The computer-implemented method of claim 6, wherein evaluating comprises determining cycling paths.

9. The computer-implemented method of claim 1, wherein the durations of routes of a list for one mode of transportation are greater penalized than the durations of routes of a list for another mode of transportation.

10. The computer-implemented method of claim 9, wherein the mode of transportation for the greater penalized durations of routes is driving.

11. The computer-implemented method of claim 1, wherein the durations of routes of each list that are subsequent to a first rout of the respective list are penalized by at least 20%.

12. The computer-implemented method of claim 1, wherein the durations of routes of each list that are subsequent to a first route of the respective list are increasingly penalized.

13. A system comprising:
one or more processors and a network interface;
the one or more processors configured to:
receive a list of one or more routes from an origin to a destination for each of two or more different modes of transportation, each route having an associated duration;
penalize the durations of routes from each list that are subsequent to a first route from the respective list,
wherein the durations of the penalized routes are increased,
wherein the durations of the routes of each list that are subsequent to a first route of the respective list are penalized by at least 10%;
combine one or more routes from each list to generate a combined list of routes for each of the two or more different modes of transportation; and
sort the combined list of routes to generate a sorted list of routes based, at least in part, on the durations and penalized durations of the routes.

14. The system of claim 13, wherein the one or more processors are further configured to provide, via the network interface, one or more routes of the sorted list of routes.

15. The system of claim 13, wherein the one or more processors are further configured to provide, via the network interface, three or more routes of the sorted list of routes.

16. The system of claim 13, wherein the durations of routes of each list that are subsequent to a first route of the respective list are increasingly penalized.

17. One or more tangible, non-transitory computer-readable media storing computer-readable instructions when executed by one or more processors performs a method, the method comprising:
receiving a list of one or more routes from an origin to a destination for each of two or more different modes of transportation, each route having an associated duration;
penalizing the durations of routes from each list that are subsequent to a first route from the respective list,
wherein penalizing the durations of the routes comprises increasing the durations of the routes,
wherein the durations of the routes of each list that are subsequent to a first route of the respective list are penalized by at least 10%;
combining one or more routes from each list to generate a combined list of routes for each of the two or more different modes of transportation; and
sorting the combined list of routes to generate a sorted list of routed based, at least in part, on the durations and penalized durations of the routes.

18. The one or more tangible, non-transitory computer-readable medium of claim 17, the one or more processors further performs sorting the combined list of routes based on a received order of the one or more routes of each list, wherein the received order is preserved such that the first route of each list remains prior to the subsequent routes of such list in the sorted list of routes.

* * * * *

UNITED STATES PATENT AND TRADEMARK OFFICE
CERTIFICATE OF CORRECTION

| | |
|---|---|
| PATENT NO. | : 9,057,612 B1 |
| APPLICATION NO. | : 13/894487 |
| DATED | : June 16, 2015 |
| INVENTOR(S) | : Savvopoulos |

It is certified that error appears in the above-identified patent and that said Letters Patent is hereby corrected as shown below:

Claims

Column 9, Line 33, Claim 5, after the word "first", please delete "rout" and insert --route--

Column 9, Line 53, Claim 11, after the word "first", please delete "rout" and insert --route--

Column 10, Line 47, Claim 47, after the word "of", please delete "routed" and insert --routes--

Signed and Sealed this
Twenty-sixth Day of July, 2016

Michelle K. Lee
*Director of the United States Patent and Trademark Office*